(12) United States Patent
Sato et al.

(10) Patent No.: US 10,513,237 B2
(45) Date of Patent: Dec. 24, 2019

(54) HEAD PROTECTION AIRBAG APPARATUS

(71) Applicants: TOYODA GOSEI CO., LTD., Kiyosu-shi, Aichi-ken (JP); HONDA MOTOR CO., LTD., Tokyo (JP)

(72) Inventors: Jun Sato, Kiyosu (JP); Hiroyuki Hirayama, Wako (JP)

(73) Assignees: TOYODA GOSEI CO., LTD., Aichi-pref. (JP); HONDA MOTOR CO., LTD., Tokyo (JP)

( * ) Notice: Subject to any disclaimer, the term of this patent is extended or adjusted under 35 U.S.C. 154(b) by 146 days.

(21) Appl. No.: 15/915,233

(22) Filed: Mar. 8, 2018

(65) Prior Publication Data

US 2018/0257599 A1 Sep. 13, 2018

(30) Foreign Application Priority Data

Mar. 13, 2017 (JP) .................................. 2017-047743

(51) Int. Cl.
*B60R 21/215* (2011.01)
*B60R 21/213* (2011.01)
*B60R 21/00* (2006.01)

(52) U.S. Cl.
CPC .......... *B60R 21/215* (2013.01); *B60R 21/213* (2013.01); *B60R 2021/0048* (2013.01)

(58) Field of Classification Search
CPC .... B60R 21/231; B60R 21/215; B60R 21/232
See application file for complete search history.

(56) References Cited

U.S. PATENT DOCUMENTS

| | | | | |
|---|---|---|---|---|
| 6,142,509 | A * | 11/2000 | White, Jr. ........... | B60R 13/0206 280/728.2 |
| 8,096,574 | B2 * | 1/2012 | Okimoto ............... | B60R 21/213 280/728.2 |
| 8,220,826 | B2 * | 7/2012 | Park ...................... | B60R 21/213 280/728.2 |
| 8,286,991 | B2 * | 10/2012 | Shimazaki ............ | B60R 21/213 280/728.2 |
| 8,632,093 | B2 * | 1/2014 | Fischer ................. | B60R 21/201 280/728.2 |
| 8,651,516 | B2 * | 2/2014 | Kim ...................... | B60R 21/213 280/730.2 |

(Continued)

FOREIGN PATENT DOCUMENTS

JP 2012-179922 A 9/2012

*Primary Examiner* — Karen Beck
(74) *Attorney, Agent, or Firm* — Posz Law Group, PLC

(57) ABSTRACT

A head protection airbag apparatus includes an airbag which is stored on an upper edge side of a vehicle window and is deployed and inflated to cover the window, and a protector which stores a folded body of the airbag. An upper edge side portion of the window includes a vehicle body side member which partially protrudes toward a vehicle inner side around an upper side of a storage region of the folded body. The protector includes a cover part which is disposed in a disposition region of the vehicle body side member. The cover part includes a door part which can be opened such that a tip end side is rotated upward while covering a region extending from a vehicle inner side lower corner part to a vehicle inner side surface of the vehicle body side member when the airbag is being deployed and inflated.

5 Claims, 11 Drawing Sheets

(56) References Cited

U.S. PATENT DOCUMENTS

| | | | | |
|---|---|---|---|---|
| 2001/0040360 A1* | 11/2001 | Ishiyama | .............. | B60R 21/213 |
| | | | | 280/728.2 |
| 2005/0225060 A1* | 10/2005 | Wold | .................... | B60R 21/213 |
| | | | | 280/728.2 |
| 2009/0091105 A1* | 4/2009 | Okimoto | ............... | B60R 21/213 |
| | | | | 280/728.3 |
| 2012/0267879 A1* | 10/2012 | Kim | ..................... | B60R 21/213 |
| | | | | 280/730.2 |
| 2018/0257599 A1* | 9/2018 | Sato | ..................... | B60R 21/215 |

\* cited by examiner

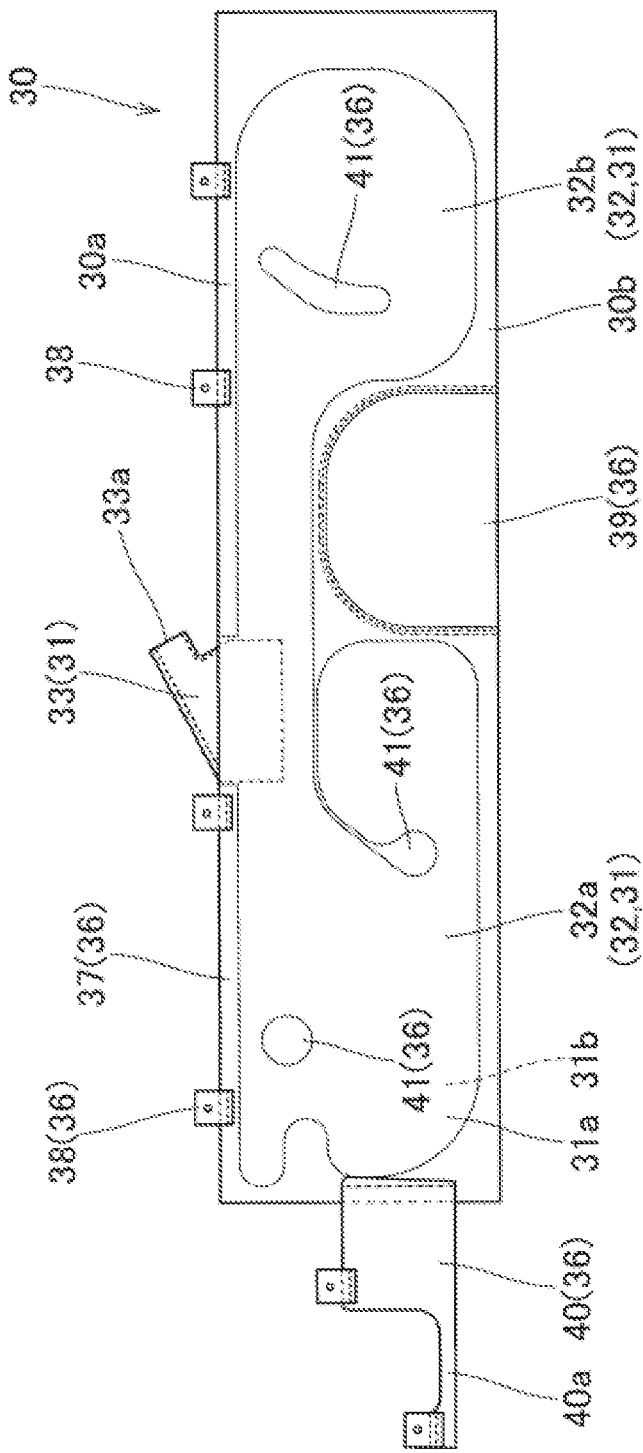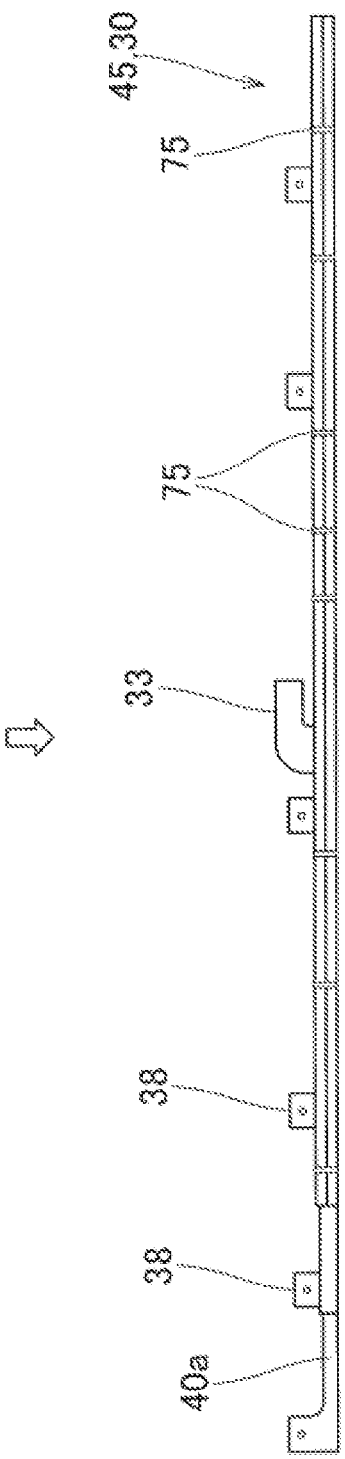

HEAD PROTECTION AIRBAG APPARATUS

CROSS-REFERENCE TO RELATED APPLICATION

This application claims priority from Japanese Patent Application No. 2017-047743, filed on Mar. 13, 2017, the entire subject matter of which is incorporated herein by reference.

TECHNICAL FIELD

The present invention relates to a head protection airbag apparatus including an airbag which is stored on an upper edge side on a vehicle inner side of a window of a vehicle and is deployed and inflated so as to cover the vehicle inner side of the window by flowing inflation gas.

BACKGROUND ART

Conventionally, there has been a head protection airbag apparatus mounted on a vehicle in which an assist grip is disposed on an upper edge side of a window (for example, see JP-A-2012-179922). In the conventional head protection airbag apparatus, a folded body, which is folded such that a lower edge side of a deployed airbag comes close to an upper edge side thereof, is stored on the upper edge side of the window, and a bracket for attaching the assist grip is disposed near a storage region of the folded body so as to partially protrude to the vehicle inner side. Further, in the conventional head protection airbag apparatus, the folded body is stored on the upper edge side of the window while a protector interposed between the folded body and the bracket covers around the folded body.

In the conventional head protection airbag apparatus, the protector is disposed so as to cover an entire area under the bracket and reduces contact between the airbag and the bracket. The protector is configured such that a tip end is protruded largely downward from the bracket to the vehicle inner side. Since the protector has a long shape so as to cover a region under two brackets including a portion between the brackets, the protector is difficult to be bent when the airbag is being deployed and inflated, so that there is a possibility of interference with the airbag to be inflated, and there is room for improvement in that the airbag can be deployed and inflated quickly and smoothly.

SUMMARY

The present invention has been made in view of the above circumstances and an object thereof is to provide a head protection airbag apparatus capable of reducing contact between a vehicle body side member and an airbag and smoothly inflating the airbag even if the vehicle body side member is disposed near a storage portion so as to partially protrude.

Accordingly, an aspect of the present invention provides a head protection airbag apparatus including: an airbag which is stored on an upper edge side in a vehicle inner side of a window of a vehicle and is deployed and inflated so as to cover the vehicle inner side of the window by flowing inflation gas; and a protector which stores a folded body of the airbag folded such that a lower edge side of the airbag comes close to an upper edge side of the airbag. The upper edge side of the airbag is attached to an upper edge side portion of a vehicle body side in an upper edge side of the window. The upper edge side portion includes a vehicle body side member partially protruding toward the vehicle inner side in a vicinity of an upper side of a storage region of the folded body. The protector includes: a main body part which covers an outer peripheral side of the folded body excluding an inflation-deployment direction side of the airbag; and a cover part which is disposed in a disposition region of the vehicle body side member and interposed between the folded body and the vehicle body side member. The cover part includes a door part which is capable of being opened such that a tip end side is rotated upward while covering a region extending from a vehicle inner side lower corner part to a vehicle inner side surface of the vehicle body side member when the airbag is being deployed and inflated.

In the above head protection airbag apparatus, the protector disposed around the folded body formed by folding the airbag includes the cover part interposed between the folded body and the vehicle body side member disposed so as to protrude partially from the upper edge portion of the vehicle body side. The cover part includes the door part capable of being opened such that the tip end side is rotated upward when the airbag is being deployed and inflated. That is, since the door part is opened such that the tip end side is rotated upward when the airbag is being deployed and inflated, the cover part does not obstruct the deployment behavior of the airbag that protrudes downward while being inflated by inflowing the inflation gas, and the airbag can be deployed and inflated quickly. Particularly, since the door part is configured to cover a region extending from the vehicle inner side lower corner part to the vehicle inner side surface of the vehicle body side member when the door part is opened, contact between the vehicle body side member and the airbag in deployment and inflation can be reduced when the airbag is being deployed and inflated.

Therefore, in the above head protection airbag apparatus, even having a configuration in which the vehicle body side member is disposed in the vicinity of the storage portion so as to partially protrude, the contact between the vehicle body side member and the airbag can be reduced and the airbag can be smoothly inflated.

In the above head protection airbag apparatus, since the cover part is configured integrally with the protector for storing the folded body, there is no need to attach the folded body and the vehicle body side member separately, and the folded body and the protector can be mounted smoothly even in a case where a gap between the storage portion of the folded body and the vehicle body side member is narrow.

Further, in the above head protection airbag apparatus, the door part may include a thick reinforcing rib which is formed to extend substantially along an axial direction of the folded body. In this case, the strength of the door part can be improved without obstructing bending deformation of the door part in rotation, and a state of high strength of the door part can be kept constant in a direction along the axial direction of the folded body. Further, even if the disposition position of the cover part displaces in a front-rear direction, since reduction in strength can be suppressed, deformation other than opening operation is reduced and the vehicle body side member can be covered by the door part even if the door part is pressed by the airbag being inflated when the airbag is being deployed and inflated.

Further, in the above head protection airbag apparatus, the reinforcing rib may be formed at least on a region in contact with the vehicle body side member when the door part is opened. In this case, the strength of the door part when contacting with the vehicle body side member can be kept, and large deformation can be further reduced.

Further, in the above head protection airbag apparatus, another reinforcing rib may be formed on the tip end side of the door part, deformation on the tip end side of the door part can be reduced when the door part is pushed to open in deployment and inflation of the airbag.

Further, in the above head protection airbag apparatus, the reinforcing rib may be formed so as to protrude outward on an outer peripheral surface. In this case, since the reinforcing rib is not disposed on a side of the folded body, the reinforcing rib is difficult to influence the airbag being deployed and inflated, and the airbag can be inflated more stably and quickly.

BRIEF DESCRIPTION OF DRAWINGS

FIG. 11A is a front view of an airbag used in the head protection airbag apparatus of the embodiment in a flatly deployed state, and FIG. 11B is a view showing a state where the airbag is folded and a wrapping material is wound.

DESCRIPTION OF EMBODIMENTS

Figure 1:
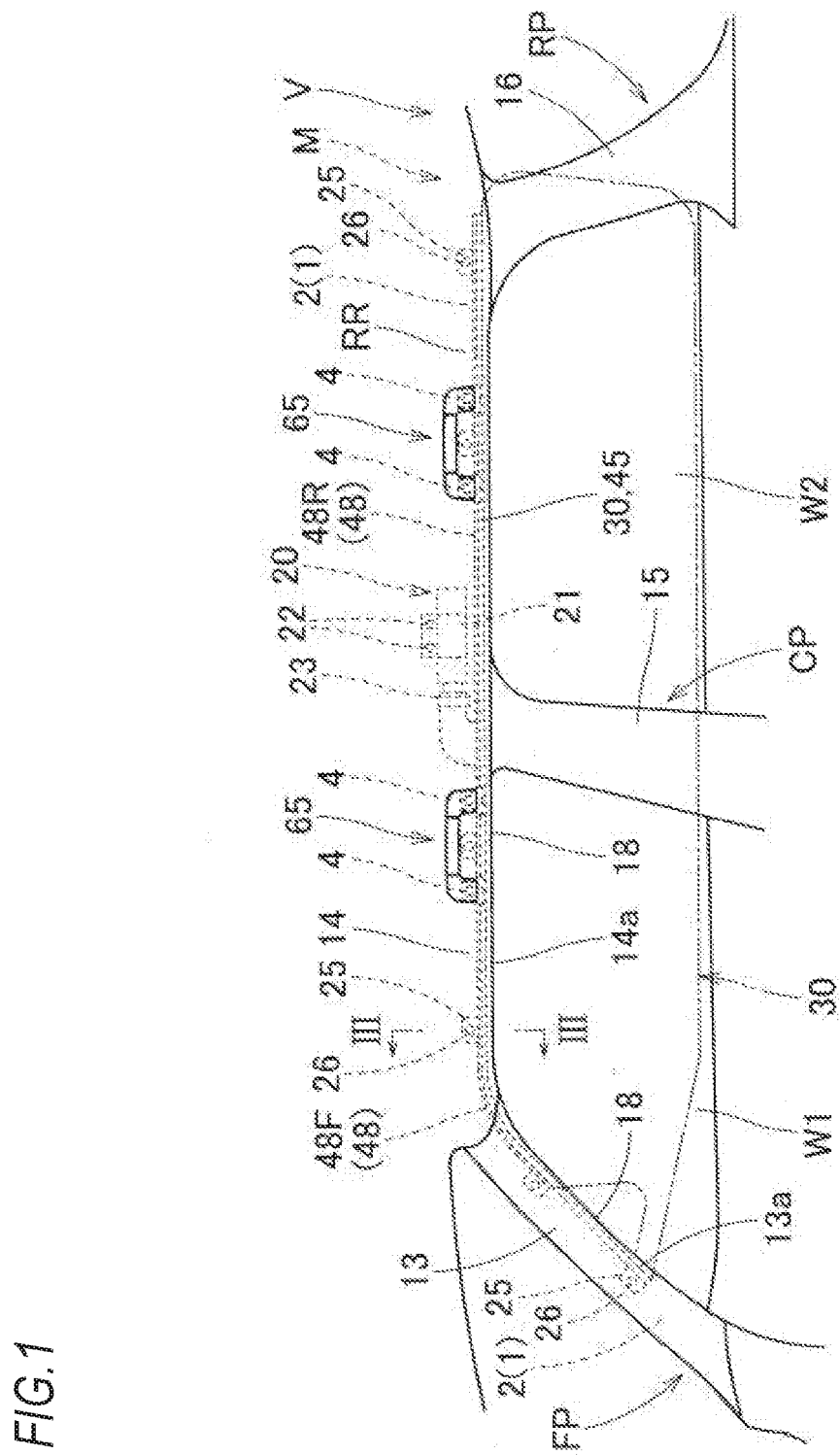
FIG. 1 is a schematic front view of a head protection airbag apparatus according to an embodiment of the present invention and viewed from a vehicle inner side.

Hereinafter, an embodiment of the present invention will be described with reference to drawings. As shown in FIG. 1, a head protection airbag apparatus M of the embodiment stores an airbag 30 on vehicle inner sides of upper edge sides of the windows (side windows) W1, W2 of a vehicle V such that when the airbag 30 in a folded state (a folded body 45) is inflated, the airbag 30 can cover the windows W1, W2. Specifically, the folded airbag 30 (the folded body 45) is mounted on a range from a front pillar part FP to the vicinity of an upper portion of a rear pillar part RP through a roof side rail part RR. In a case of the embodiment, as shown in FIG. 1, the vehicle V is configured such that a center pillar part CP is disposed between the front pillar part FP and the rear pillar part RP so as to extend substantially along an upper-lower direction, and an assist grip 65 is disposed at a position in a vicinity of an upper side of a storage portion P (a storage region) of the folded airbag 30 (the folded body 45), i.e., a region of the roof side rail part RR which is the upper edge side of each of the windows W1, W2.

Figure 2:
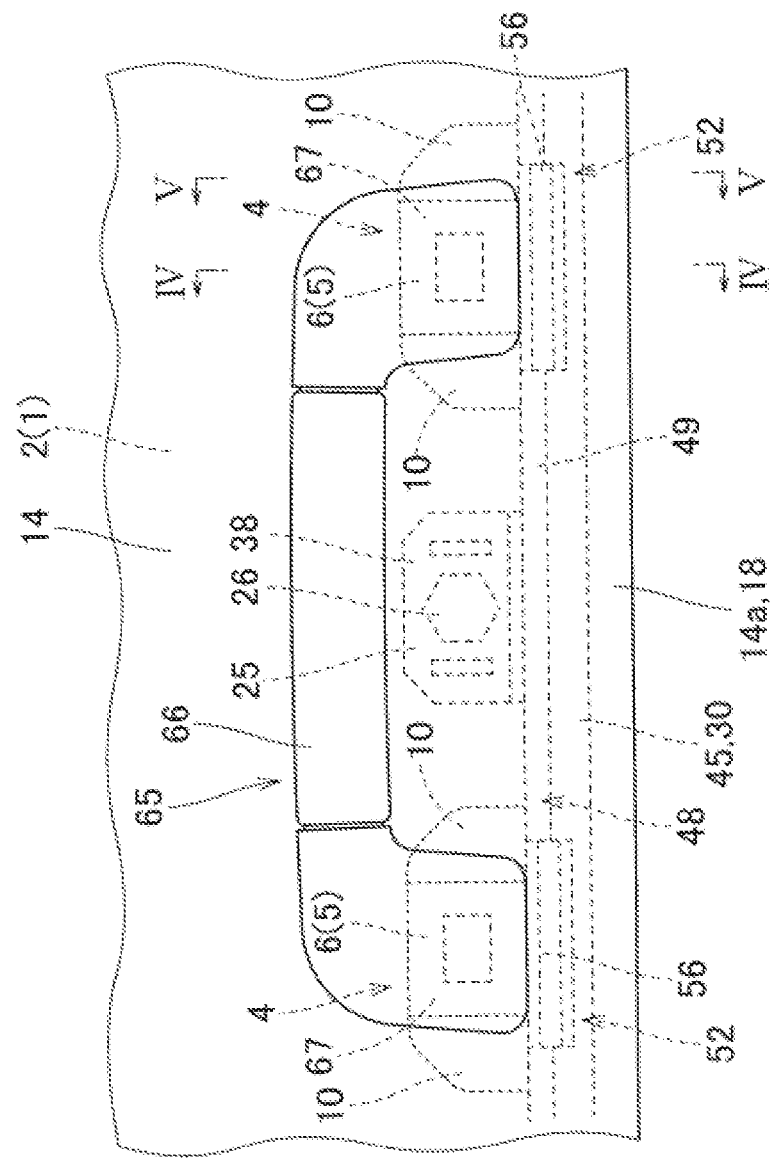
FIG. 2 is a partially enlarged front view showing a disposition region of an assist grip in the head protection airbag apparatus of the embodiment.
Figure 4:
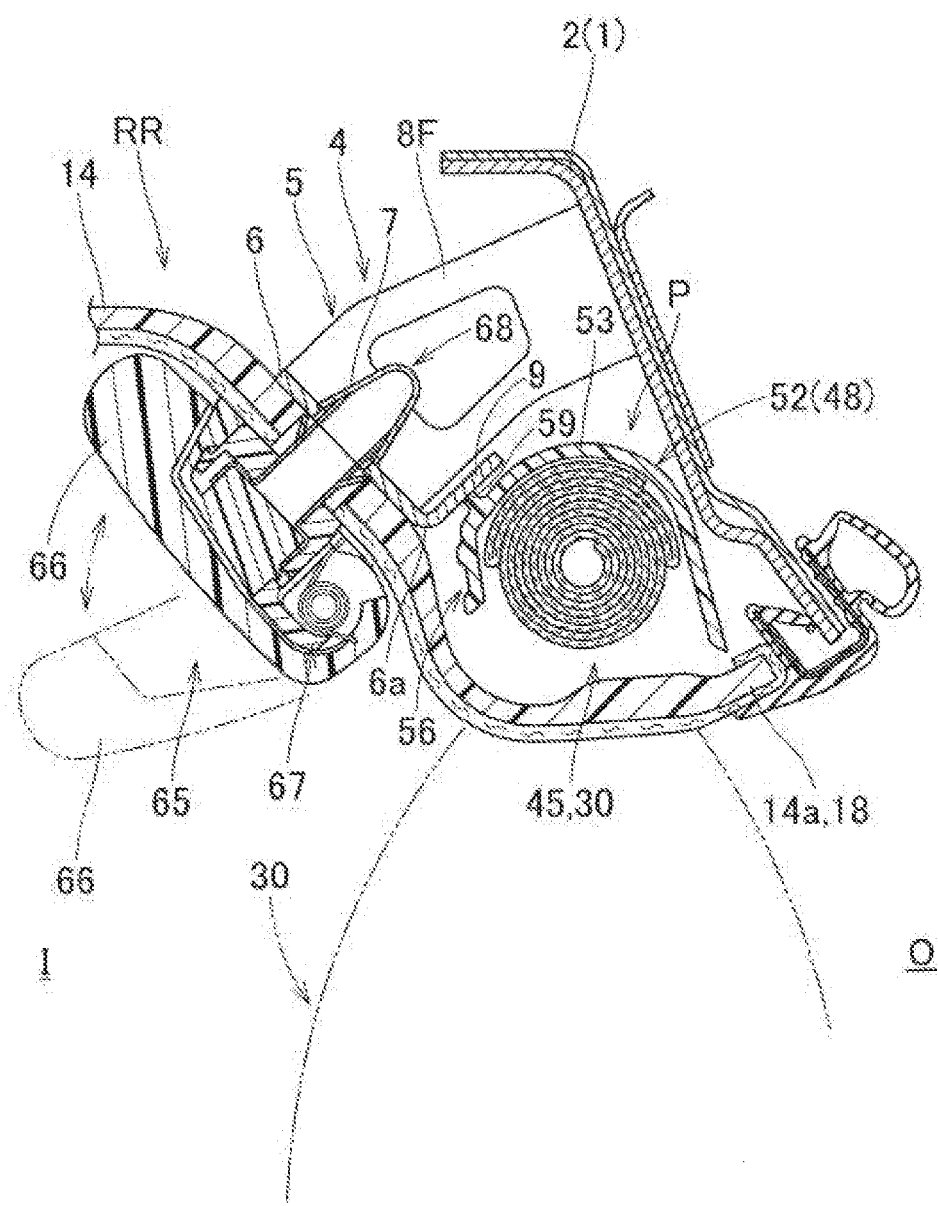
FIG. 4 is a longitudinal sectional view taken along a line IV-IV in FIG. 2 and showing a state where the head protection airbag apparatus of the embodiment is mounted on the vehicle.

As shown in FIGS. 1, 2 and 4, the assist grip 65 is disposed on the vehicle inner side I of the roof side rail part RR on the upper edge side of each of the windows W1, W2 and includes a grip part 66 having an inverted U shape and fixing parts 67, 67 disposed on both front and rear end sides of the grip part 66. The grip part 66 is rotatable with respect to the fixing parts 67 via a hinge mechanism (not shown). When used, as shown by the two-dot chain line in FIG. 4, the grip part 66 is rotated to be pulled out to the vehicle inner side I. Each fixing part 67 is attached to an attachment bracket 4 extending from an inner panel 2 such as a side member configuring an upper edge portion 1 on a vehicle body side and includes an engaging piece 68 which is engaged with a periphery of an engaging hole 7 formed in the attachment bracket 4 through a roof head lining 14 which is disposed to cover the vehicle inner side I of the roof side rail part RR and configures an airbag cover 18.

Figure 13:
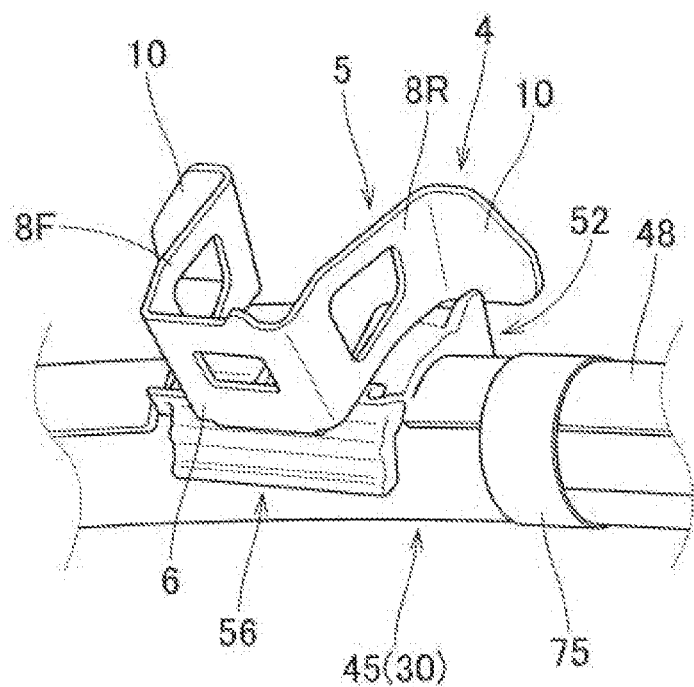
FIG. 13 is a schematic partially enlarged perspective view showing a state where the folded body stored in the protector and an attachment bracket are arranged in the head protection airbag apparatus of the embodiment.

In the embodiment, as shown in FIG. 2, the attachment brackets 4 for attaching the fixing parts 67, 67 of the assist grip 65 are disposed on two positions apart from each other in the front-rear direction corresponding to the fixing parts 67, 67. The attachment bracket 4 is formed of a sheet metal and includes a main body part 5 which is bent in a substantially U shape as viewed from the upper-lower direction such that the vehicle outer side O is opened, and attachment pieces 10, 10 which are formed to respectively extend from a vehicle outer side end part of the main body part 5 toward outer sides in the front-rear direction (see the two-dot chain line in FIGS. 9 and 10, and FIG. 13). Particularly, the main body part 5 includes a vehicle inner side wall part 6 disposed on the vehicle inner side I and extending substantially along the front-rear direction, a front wall 8F and a rear wall 8R disposed so as to respectively protrude from a front edge side and a rear edge side of the vehicle inner side wall part 6 toward the vehicle outer side O, and a lower wall 9 disposed so as to partially protrude from a lower edge 6a of the vehicle inner side wall part 6 toward the vehicle outer side O. As shown in FIG. 4, the lower wall 9 is disposed only on a region in the vicinity of the vehicle inner side wall part 6 and is formed on a region which is the vehicle inner side I of a later-described protrusion part 54 of a protector 48 when mounted onto the vehicle. The attachment bracket 4 is disposed on a position substantially right above the storage portion P (the storage region) for storing the folded body 45 stored in the protector 48. The attachment pieces 10, 10 are coupled to the inner panel 2 by welding such that the main body part 5 partially protrudes from the inner panel 2 such as the side member configuring the upper edge portion 1 on the vehicle body side. In the main body part 5, the engaging hole 7 for engaging the engaging piece 68 of the fixing part 67 on the periphery is formed in the vehicle inner side wall part 6 disposed on the vehicle inner side I so as to open in a substantially rectangular shape. In the head protection airbag apparatus M of the embodiment, the attachment bracket 4 configure a vehicle body side member.

As shown in FIGS. 1 to 4, the head protection airbag apparatus M includes the airbag 30, an inflator 20 for supplying inflation gas to the airbag 30, attachment brackets 21, 25, attachment bolts 22, 26, a clamp 23, the protector 48 for storing and protecting the folded body 45 formed by folding the airbag 30, and the airbag cover 18 for covering the vehicle inner side of the folded airbag 30 (the folded body 45). The airbag cover 18 is configured to cover the vehicle inner side I of the inflator 20, the protector 48 and the attachment brackets 21, 25 in addition to the folded airbag 30 (the folded body 45), when mounted onto the vehicle V (see FIGS. 3 and 4). In the embodiment, the airbag cover 18 includes a lower edge 13a of a front pillar garnish 13 for covering the vehicle inner side of the front pillar part FP and a lower edge 14a of the roof head lining 14 for covering the vehicle inner side of the roof side rail part RR.

The front pillar garnish 13 and the roof head lining 14 along with a center pillar garnish 15 and a rear pillar garnish 16 are formed of synthetic resin and attached to the vehicle inner side I of the inner panel 2 configuring an upper edge side member 1 on the front pillar part FP and the roof side rail part RR by attaching means (not shown). The airbag cover 18 including the lower edge 13a of the front pillar garnish 13 and the lower edge 14a of the roof head lining 14 is configured such that the airbag 30 in deployment and inflation can protrude, and the lower edge is opened to the vehicle inner side I when pressed by the airbag 30 (see FIGS. 4 and 14). Specifically, the airbag cover 18 is disposed in contact with the vehicle inner side wall part 6 to be sandwiched by the fixing part 67 of the assist grip 65 and the vehicle inner side wall part 6 of the attachment bracket 4 in a disposition position of the assist grip 65 and is pushed to open such that a gap occurs between the airbag cover 18 and the vehicle inner side wall part 6 of the attachment bracket 4 when the airbag 30 is being deployed and inflated (see FIGS. 4 and 14).

The inflator 20 supplies the inflation gas to the airbag 30. As shown in FIG. 1, a gas discharge port (not shown) which can discharge the inflation gas is disposed on a tip end side of the inflator 20 which is a substantially cylindrical cylinder type. The tip end side of the inflator 20 including the gas discharge port is inserted into a later-described inflow port part 33 of the airbag 30, and the inflator 20 is connected to the airbag 30 by using the clamp 23 disposed on an outer peripheral side of a rear end side of the inflow port part 33. In addition, the inflator 20 is attached to the inner panel 2 by using the attachment bracket 21 for holding the inflator 20 and the bolt 22 for fixing the attachment bracket 21 to the inner panel 2 configuring the upper edge portion 1 on the vehicle body side.

The attachment bracket 25 includes two plates formed of a sheet metal and is attached to later-described attachment parts 38 of the airbag 30 by sandwiching the attachment part 38 from front and rear sides. The attachment part 38 is attached and fixed to the inner panel 2 configuring the upper edge portion 1 by using the bolt 26 (see FIG. 2).

As shown by the two-dot chain line in FIG. 1, the airbag 30 is configured to be deployed and inflated by flowing the inflation gas from the inflator 20 from a folded state, so as to cover the vehicle inner side of the windows W1, W2, the center pillar garnish 15 and the rear pillar garnish 16 on the center pillar part CP and the rear pillar part RP. As shown in FIG. 11A, the airbag 30 includes the gas inflow part 31 which is used for inflating such that the vehicle inner side wall part 31a and the vehicle outer side wall part 31b are separated by flowing the inflation gas, and a non-inflow part 36 which is formed so as to connect the vehicle inner side wall part 31a to the vehicle outer side wall part 31b and does not allow flow of the inflation gas. In the embodiment, the gas inflow part 31 includes a protective inflation part 32 and the inflow port part 33, and the non-inflow part 36 includes a peripheral part 37, attachment parts 38, plate parts 39, 40, and closed parts 41.

As shown in FIG. 11A, the protective inflation part 32 of the gas inflow part 31 includes a front protection part 32a for covering the window W1 at a side of a front seat and a rear protection part 32b for covering the window W2 at a side of a rear seat when the airbag 30 is inflated. The inflow port part 33 is formed to protrude upward in the vicinity of the center of the airbag 30 in the front-rear direction (in the embodiment, in the vicinity of a rear end of the front protection part 32a). The inflow port part 33 is formed to protrude upward from an upper edge 30a of the airbag 30 while tilting rearward and is opened at a rear end 33a such that the inflator 20 can be connected. The closed parts 41 are disposed on an inner region of the front protection part 32a and the rear protection part 32b such that when the airbag 30 is inflated, a width dimension in the front-rear direction is shortened as compared with a flatly deployed state, and the plate shape extending in the front-rear direction can be maintained with a thickness thereof being restricted.

The peripheral part 37 of the non-inflow part 36 is formed to surround an outer periphery of the gas inflow part 31 over an entire area excluding the rear end 33a of the inflow port part 33. The plate part 39 is disposed between the front protection part 32a and the rear protection part 32b and has a substantially rectangular plate shape. The plate part 40 is disposed on a front end side of the airbag 30 and has a substantially rectangular plate shape, and a belt part 40a extending forward and having a substantially belt shape is disposed on a lower end side of the plate part 40.

The attachment part 38 includes a front end side of the belt part 40a of the plate part 40, is disposed on an upper edge 30a side when the airbag 30 is inflated, and is a portion for attaching the upper edge 30a side of the airbag 30 to the inner panel 2 configuring the upper edge side portion 1 on the vehicle side of the vehicle V. A plurality of the attachment parts 38 (six in the embodiment) are disposed along the front-rear direction and are attached to the inner panel 2 configuring the upper edge side portion 1 by using the attachment bracket 25 and the bolt 26, as mentioned above.

Figure 3:
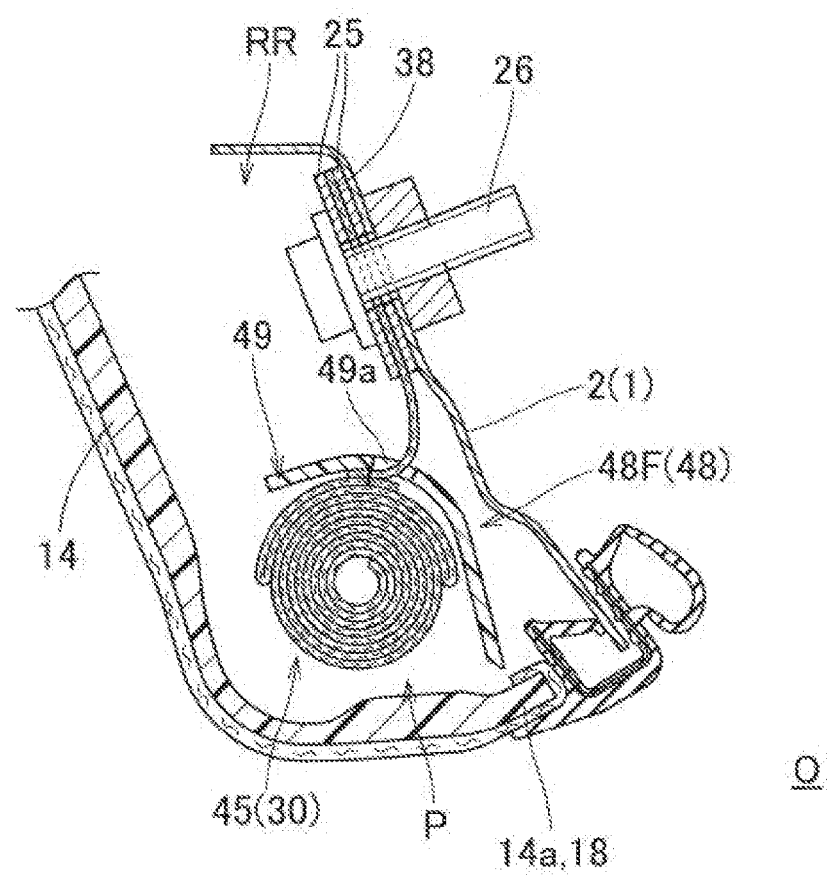
FIG. 3 is a longitudinal sectional view taken along a line in FIG. 1 and showing a state where the head protection airbag apparatus of the embodiment is mounted on a vehicle.

The airbag 30 is mounted on the vehicle V while being folded from the flatly deployed state where the vehicle inner side wall part 31a and the vehicle outer side wall part 31b are overlapped so as to come a lower edge 30b side close to the upper edge 30a side to form the long folded body 45 along the front-rear direction, as shown in FIG. 11B. In the embodiment, as shown in FIGS. 3 and 4, the airbag 30 is folded by bellows-folding a region of the upper edge 30a side, and by roll-folding such that a region on a lower part side is wound from the lower edge 30b side toward the vehicle outer side O. In the folded body 45, the attachment parts 38 and the inflow port part 33 are disposed so as to protrude upward from an upper surface of the folded body 45, as shown in FIG. 11B.

The protector 48 for storing and protecting the folded airbag 30 (the folded body 45) is formed of synthetic resin and formed from a polyolefin thermoplastic elastomer (TPO) in the embodiment. As shown in FIGS. 2 to 4, the protector 48 has a substantially inverted U-shape in a cross section capable of storing the folded airbag 30 (the folded body 45) and is formed in a long shape extending in the front-rear direction. In the embodiment, as shown in FIG. 1, a protector 48F for storing a portion of the front protection part 32*a* and a protector 48R for storing a portion of the rear protection part 32*b* are used in the folded body 45.

Figure 6:
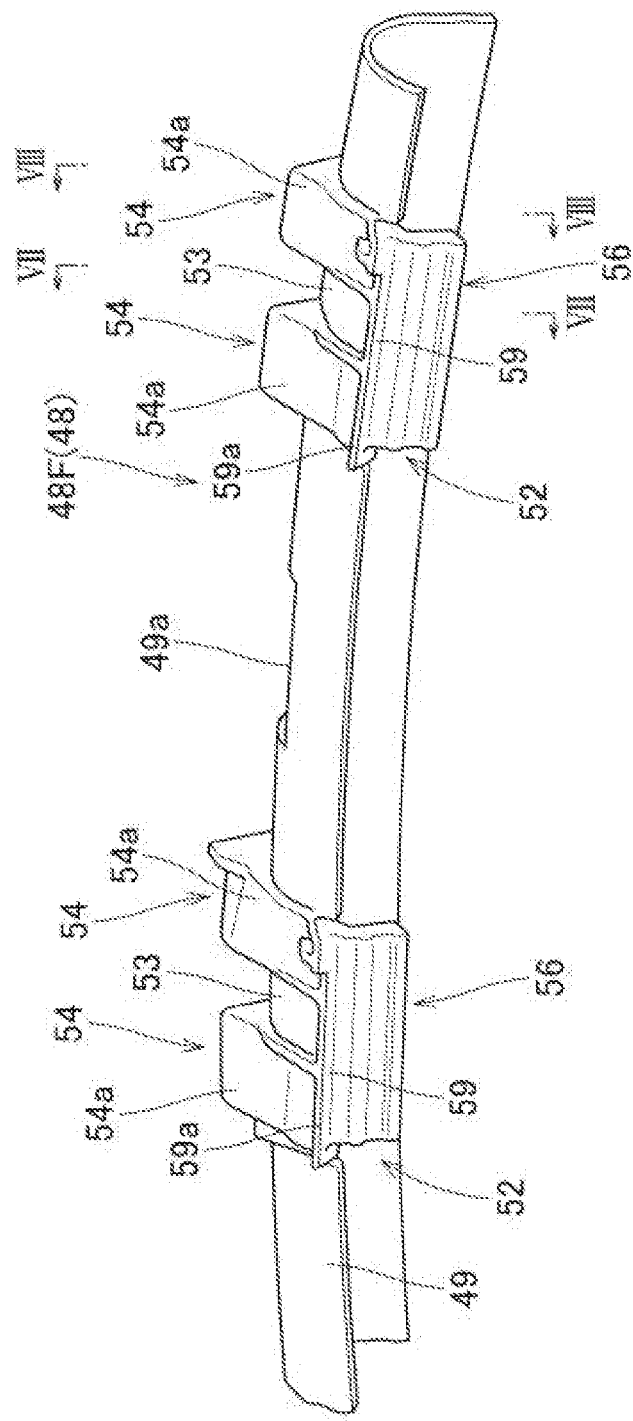
FIG. 6 is a schematic partially enlarged perspective view of a protector used in the head protection airbag apparatus of the embodiment.

As shown in FIG. 6, the protector 48 (48F, 48R) includes a long main body part 49 for covering an outer peripheral side excluding an inflation-deployment direction side (the vehicle inner side I) of the airbag 30 in the folded body 45 and cover parts 52 respectively disposed on the disposition regions of the attachment brackets 4 (the vehicle body side member) for attaching the assist grip 65. Incidentally, in the embodiment, the protector 48F disposed on the front side is taken as an example and will be described in detail.

As shown in FIG. 2, the main body part 49 is configured to cover from an upper surface side of the folded body 45 to the vehicle outer side O. In the main body part 49, an opening 49*a* which enables the attachment part 38 in a state where the attachment bracket 25 is attached to protrude, is formed on a region where the attachment part 38 is disposed (see FIGS. 2 and 6).

Figure 9:
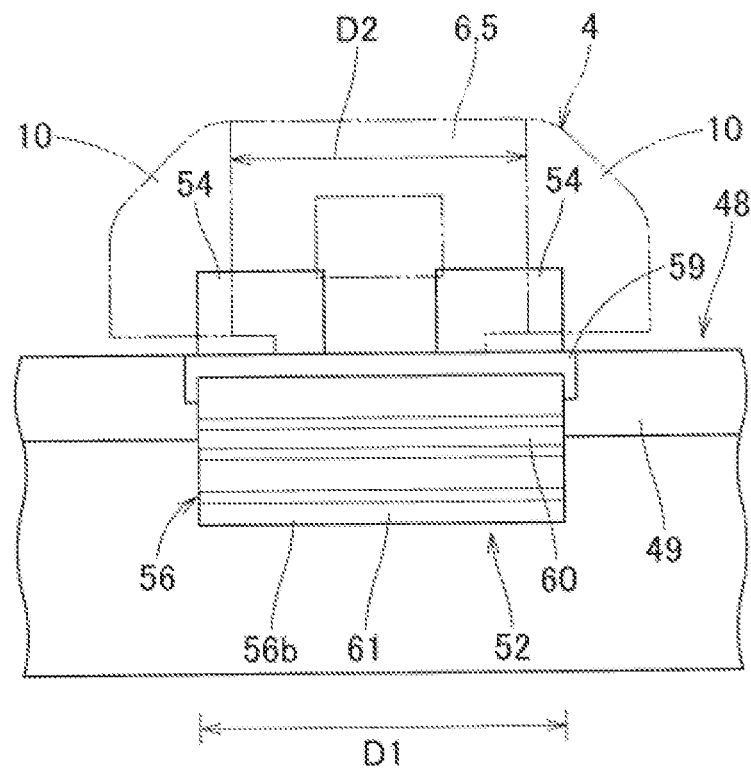
FIG. 9 is a partially enlarged front view of the protector in FIG. 6.
Figure 10:
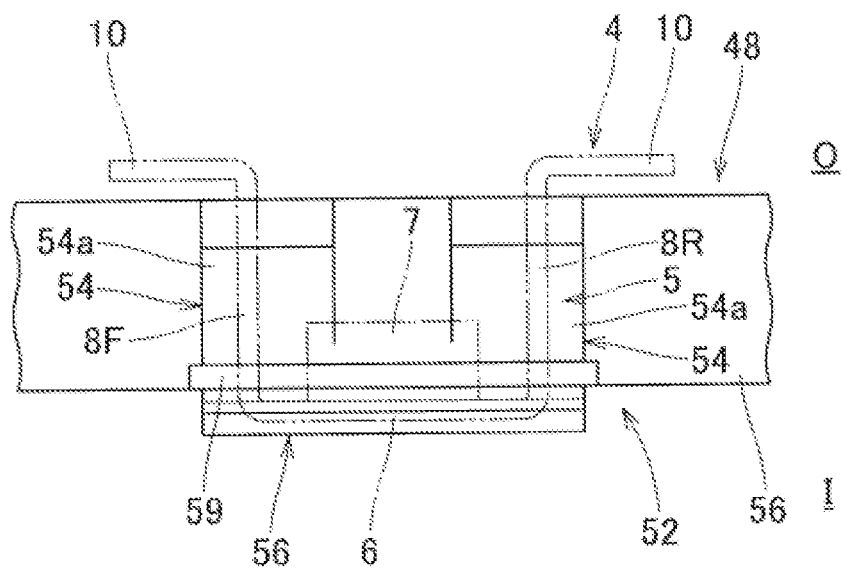
FIG. 10 is a partially enlarged plan view of the protector in FIG. 6.

As shown in FIG. 6, the cover parts 52 are disposed on two positions apart from each other in the front-rear direction corresponding to the attachment brackets 4, which are disposed apart from each other in the front-rear direction, in order to fix the fixing parts 67 in the front and rear of the assist grip 65 and are configured to share regions on the vehicle outer side with the main body portion 49. As shown in FIGS. 3 and 4, one cover part 52 is configured to be interposed between the folded body 45 and one attachment bracket 4 and to prevent contact between the attachment bracket 4 and the airbag 30 in deployment and inflation. The cover part 52 includes an upper side portion 53 interposed between the folded body 45 and the attachment bracket 4 and continuously disposed from a portion on the vehicle outer side of the main body part 49 to cover the upper surface side of the folded body 45, a door part 56 formed to protrude downward from the upper side portion 53, and a hinge part 58 disposed on a base part 56*a* side, which is an upper portion 53 side, on the door part 56. As shown in FIGS. 9 and 10, a width dimension D1 of the cover part 52 in the front-rear direction is greater than a width dimension D2 of the main body part 5 of the attachment bracket 4 in the front-rear direction. When the cover part 52 is mounted onto the vehicle, even if some assembling error occurs due to displacement in the front-rear direction with respect to the attachment bracket 4 fastened to the inner panel 2, the width dimension D1 is set reliably to a size at which the cover part 52 can be disposed below the attachment bracket 4.

Figure 5:
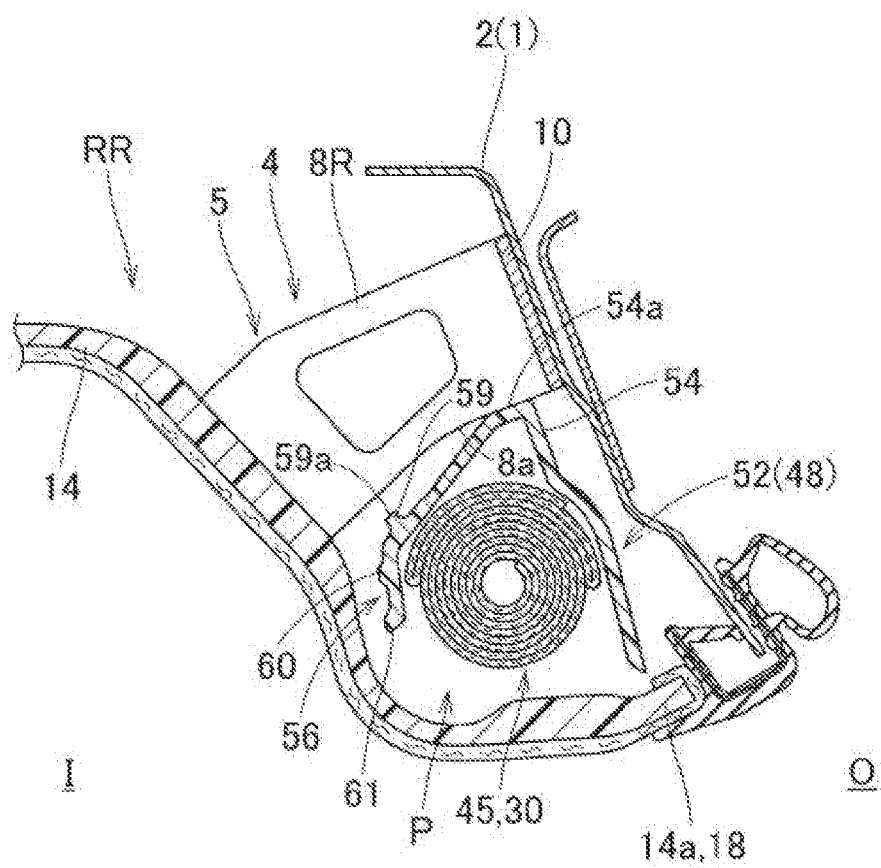
FIG. 5 is a longitudinal sectional view taken along a line V-V in FIG. 2 and showing a state where the head protection airbag apparatus of the embodiment is mounted on the vehicle.

On the upper side portion 53, the protrusion part 54 protruding upward is formed so as to abut the upper surface 54*a* against a lower end surface 8*a* of the front wall 8F and the rear wall 8R of the main body part 5 of the attachment bracket 4 when mounted onto the vehicle (see FIG. 5). In the embodiment, as shown in FIGS. 6, 8 to 10, the protrusion part 54 is formed on a region excluding the vicinity of the center in the front-rear direction.

Figure 7:
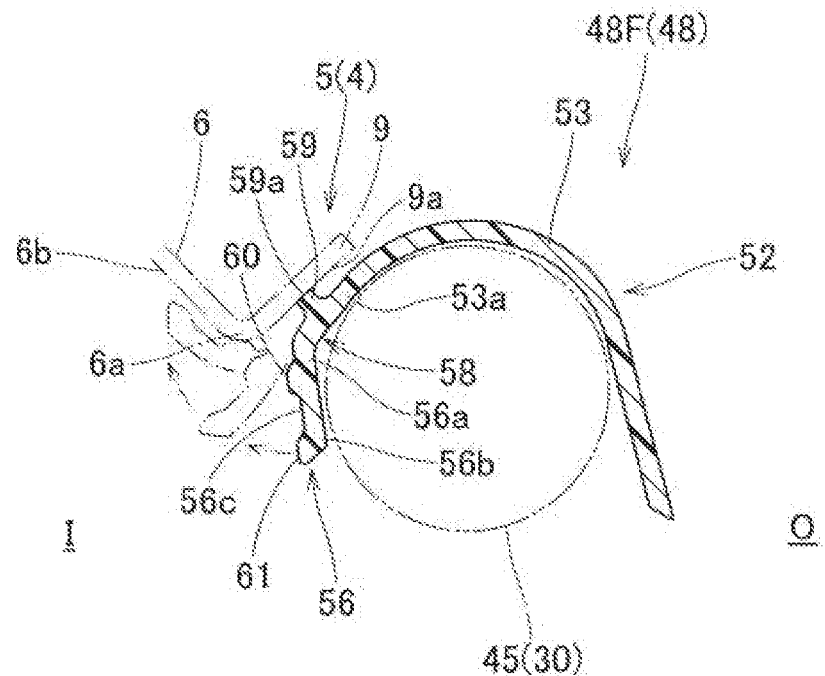
FIG. 7 is a longitudinal sectional view of the protector taken along a line VII-VII in FIG. 6.
Figure 8:
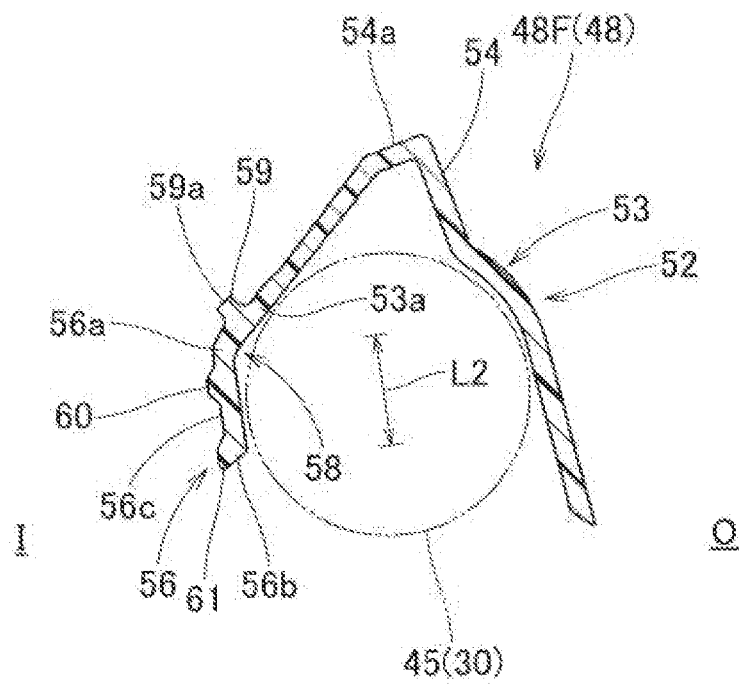
FIG. 8 is a longitudinal sectional view of the protector taken along a line VIII-VIII in FIG. 6.

The door part 56 is formed to protrude downward from the vehicle inner side end part 53*a* of the upper side portion 53, and as shown in FIGS. 7 and 8, is configured in a substantially plate shape extending downward while bending to the upper part 53 so as to be capable of covering the vehicle inner side I of the folded body 45 having a substantially circular shape in a cross section. In the embodiment, the door part 56 is disposed slightly inclined to the upper-lower direction (a vertical direction) so as to position a tip end 56*b* slightly on the vehicle outer side O of the base part 56*a* when mounted onto the vehicle (see FIGS. 4 and 5), and is configured to position the tip end 56*b* below an axis of the folded body 45 and cover about an upper half of the vehicle inner side I of the folded body 45. The hinge part 58 is a rotation center of the door part 56 in opening and formed to extend substantially along an axial direction (the front-rear direction) of the folded body 45 on the base part 56*a* side of the door part 56. In the embodiment, as shown in FIGS. 7 and 8, the hinge part 58 includes a boundary portion (a bend point) of the door part 56 and the upper side portion 53. A length dimension L1 (see FIG. 8) of the door part 56 from the base part 56*a* (the hinge part 58) to the tip end 56*b* is set to a dimension capable of covering a region extending from a vehicle inner side lower corner part of the attachment bracket 4, which is exposed by opening the airbag cover 18, to a vehicle inner side surface when the door part 56 is opened in deployment and inflation of the airbag 30. Particularly, as shown by the two-dot chain line in FIG. 7, the door part 56 is configured to dispose the tip end 56*b* on a position which is the vehicle inner side of the vehicle inner side wall part 6 by exceeding the lower edge 6*a* of the vehicle inner side wall part 6 in the attachment bracket 4 when the door part 56 is opened such that a tip end 56*b* side is rotated upward.

On the base part 56*a* side of the door part 56, in the vicinity of the hinge part 58 (specifically, the vehicle inner side adjacent to the hinge part 58), a protrusion part 59, which protrudes upward and is configured such that when mounted onto the vehicle, the upper surface 59*a* is abutted against a lower surface 9*a* of the lower wall 9 in the attachment bracket 4, is continuously formed over the entire area in the front-rear direction to extend substantially along the front-rear direction (the axial direction of the folded body) (see FIGS. 6 to 8). Incidentally, the hinge part 58 includes a portion where stress concentration in the vicinity of the protrusion part 59 formed thickly is easy to occur. In addition, reinforcing ribs 60, 61 are formed on the door part 56. As shown in FIGS. 7 and 8, the reinforcing ribs 60, 61 are thickly formed to partially protrude outward on an outer peripheral surface 56*c* side of the door part 56. As shown in FIGS. 6 and 9, the reinforcing ribs 60, 61 are continuously formed over the entire area in the front-rear direction to extend substantially along the axial direction (front-rear direction) of the folded body 45. In the embodiment, the reinforcing ribs 60, 61 are formed on two positions on the base part 56*a* side and the tip end 56*b* side of the door part 56. The reinforcing rib 60 disposed on the base part 56*a* side is disposed on a position slightly closer to the tip end 56*b* side than the hinge part 58 and formed in a region in contact with the attachment bracket 4 when the door part 56 is opened. Particularly, the reinforcing rib 60 is disposed in the vicinity of a vehicle inner side lower corner (the lower edge 6*a* of the vehicle inner side wall part 6) of the attachment bracket 4 when the door part 56 is opened, as shown by the two-dot chain line in FIG. 7.

Figure 12:
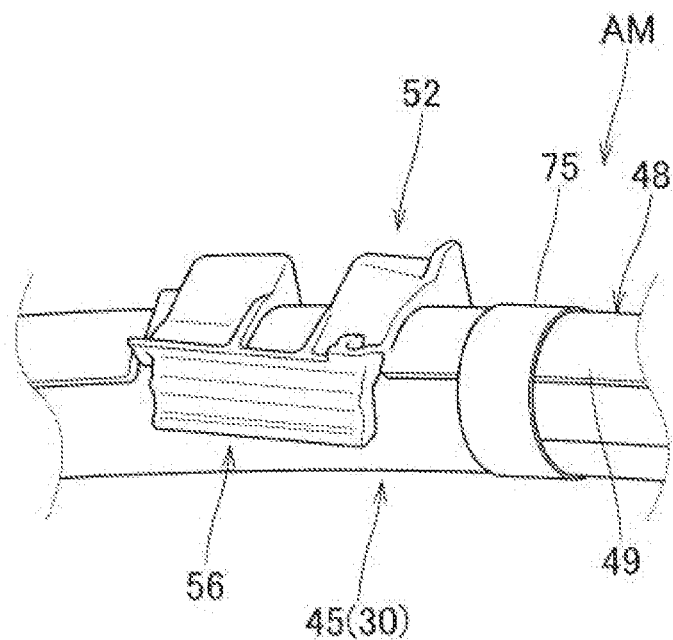
FIG. 12 is a schematic partially enlarged perspective view showing a state where a folded body is stored in the protector in the head protection airbag apparatus of the embodiment.

Next, mounting of the head protection airbag apparatus M of the embodiment onto the vehicle V will be described. At first, the airbag 30 is folded as shown in FIG. 11B. In the embodiment, from the flatly deployed state where the vehicle inner side wall part 31*a* and the vehicle inner side wall part 31*b* are overlapped, a region on the upper edge 30*a* side of the airbag 30 is bellows-folded with a fold substantially parallel to the upper edge 30*a*, and a lower region is roll-folded such that the lower edge 30*b* is wound on the side of the vehicle outer side wall part 31*b*. Therefore, the folded body 45 is formed. Thereafter, a breakable wrapping material is wrapped partially around the folded body 45 (see FIG. 11B). Next, the attaching bracket 25 is attached to the attachment part 38 protruding from the folded body 45, the inflator 20 having the attachment bracket 21 attached thereto is inserted into the inflow port part 33, and the inflow port part 33 and the inflator 20 are connected by the clamp 23. Thereafter, the folded body 45 is stored in the protector 48 (48F, 48R) by protruding each of the attachment parts 38 from the opening 49a. Once the wrapping material is wound around the protector 48 and the folded body 45 from the outer peripheral side of the protector 48, an airbag assembly AM can be formed (see FIG. 12).

The attachment brackets 21, 25 of the airbag assembly AM are disposed on predetermined positions of the inner panel 2 configuring the upper edge side portion 1, and the bolts 22, 26 are fastened. A lead wire (not shown) extending from a control apparatus for operating a predetermined inflator is connected to the inflator 20. The front pillar garnish 13 and the roof head lining 14 are attached to the inner panel 2 configuring the upper edge side portion 1. Further, after the center pillar garnish 15 and rear pillar garnish 16 are attached to the inner panel 2, once the assist grip 65 is attached to the inner panel 2 by using the attachment brackets 4, the head protection airbag apparatus M can be mounted onto the vehicle V.

After the head protection airbag apparatus M is mounted onto the vehicle V, when the inflator 20 is operated after receiving an operation signal from the control apparatus, the inflation gas discharged from the inflator 20 flows to the airbag 30. The airbag 30 being inflated pushes to open the airbag cover 18 and is deployed while protruding downward. As shown by the two-dot chain line in FIGS. 1 and 14, the vehicle inner side of the windows W1, W2, and the center pillar part CP and the rear pillar part RP are covered, so that the inflation is completed.

In the head protection airbag apparatus M of the embodiment, the protector 48 disposed around the folded body 45 formed by folding the airbag 30 includes the cover parts 52 respectively interposed between the folded body 45 and the attachment bracket 4, as the vehicle body side member, disposed to partially protrude from the inner panel 2 configuring the upper edge side part 1. The cover part 52 includes the door part 56 capable of being opened to rotate the tip end 56b side upward when the airbag 30 is being deployed and inflated. That is, since the door part 56 is opened to rotate the tip end 56b side upward when the airbag 30 is being deployed and inflated, the cover part 52 does not obstruct the deployment behavior of the airbag 30 which protrudes downward while inflating by flowing the inflation gas, and the airbag 30 can be deployed and inflated quickly. Particularly, as shown by the two-dot chain line in FIG. 7, since the door part 56 is configured to cover the region extending from the vehicle inner side lower corner part (the lower edge 6a of the vehicle inner side wall part 6) of the attachment bracket 4 to the vehicle inner side surface (the vehicle inner side surface 6b of the vehicle inner side wall part 6) when the door part 56 is opened, the contact between the attachment bracket 4 and the airbag 30 can be prevented. Incidentally, in the embodiment, the door part 56 is opened with the hinge part 58 as a rotation center.

Therefore, in the head protection airbag apparatus M of the embodiment, even having a configuration in which the attachment bracket 4, as the vehicle body side member, is disposed in the vicinity of the storage portion P so as to partially protrude, the contact between the attachment bracket 4 and the airbag 30 can be reduced, and the airbag 30 can be smoothly inflated.

Figure 14:
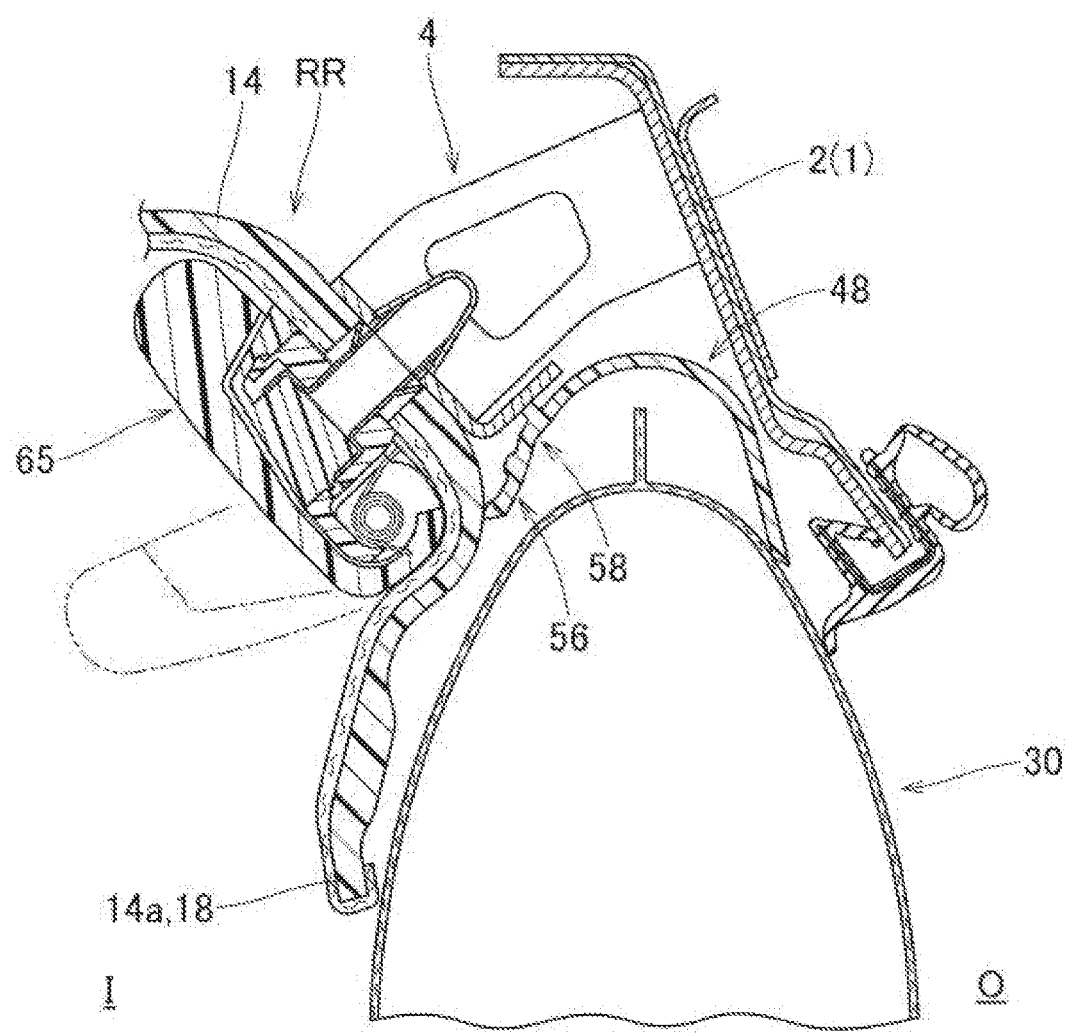
FIG. 14 is a longitudinal sectional view showing a state where the airbag is inflated in the head protection airbag apparatus of the embodiment.

Especially, in the head protection airbag apparatus M of the embodiment, when the airbag 30 is being deployed and inflated, a gap occurs between the airbag cover 18 and the attachment bracket 4 (see FIG. 14). In the embodiment, since the opened door part 56 covers the region extending from the vehicle inner side lower corner part (the lower edge 6a of the vehicle inner side wall part 6) of the attachment bracket 4 to the vehicle inner side surface (the vehicle inner side surface 6b of the vehicle inner side wall part 6), as shown by the two-dot chain line in FIG. 7, the gap can be covered reliably by the door part 56.

In the head protection airbag apparatus M of the embodiment, since the cover part 52 is configured integrally with the protector 48 for storing the folded body 45, there is no need to be attached the folded body 45 and the attachment bracket 4 separately, and the airbag assembly AM (the folded body 45 and the protector 48) can be mounted smoothly in a case where the gap between the storage portion P of the folded body 45 and the attachment bracket 4 is narrow.

Further, in the head protection airbag apparatus M of the embodiment, since the door part 56 is configured such that the thick reinforcing ribs 60, 61, which are formed to extend substantially along the axial direction (the front-rear direction) of the folded body 45, are disposed, strength of the door part 56 can be improved without obstructing bending deformation of the door part 56 in rotation, and a state of high strength of the door part 56 can be kept constant in a direction along the axial direction of the folded body 45. Therefore, when mounted on the vehicle, even if the disposition position of the cover part 52 displaces in the front-rear direction with respect to the attachment brackets 4, since reduction in strength can be suppressed, deformation other than opening operation is reduced and the attachment brackets 4 can be covered by the door part 56 even if the door part 56 is pressed by the airbag 30 being inflated when the airbag 30 is being deployed and inflated.

Further, in the head protection airbag apparatus M of the embodiment, as shown by the two-dot chain line in FIG. 7, since the reinforcing rib 60 is formed on a region in contact with the attachment brackets 4 when the door part 56 is opened, the strength of the door part 56 when contacting with the attachment brackets 4 can be kept, and large deformation can be further suppressed. In the embodiment, since the reinforcing rib 61 is also formed on the tip end 56b side of the door part 56, deformation on the tip end 56b side of the door part 56 can also be reduced when the door part 56 is pushed to open in deployment and inflation of the airbag 30.

Furthermore, in the embodiment, the reinforcing ribs 60, 61 are formed to protrude outward on the outer peripheral surface 56c side of the door part 56. That is, in the embodiment, since the reinforcing ribs 60, 61 are not disposed on an inner peripheral surface side which is the side of the folded body 45, the reinforcing ribs 60, 61 are difficult to influence the airbag 30 being deployed and inflated, and the airbag 30 can be inflated more stably and quickly.

In the embodiment, the attachment brackets for attaching the assist grip on the bolt side configures the vehicle body side member partially protruding from the upper edge portion of the vehicle body side toward the vehicle inner side, but the vehicle body side member is not an attachment bracket for attaching an air outlet of an air conditioner, or an interior material attachment member such as the assist grip, and examples of the vehicle body side member may be a roof arch (side member) which is a member on the vehicle body side and disposed so as to partially protrude from the inner panel 2. In the embodiment, the airbag cover 18 is disposed to contact with the vehicle inner side wall part 6 of the attachment bracket 4 so as to cover the vehicle inner side of the attachment brackets 4, as the vehicle body side member, without the gap, but the airbag cover may be disposed separately from the vehicle body side member in advance.

The invention claimed is:

1. A head protection airbag apparatus comprising:
    an airbag which is stored on an upper edge side in a vehicle inner side of a window of a vehicle and is deployed and inflated so as to cover the vehicle inner side of the window by flowing inflation gas; and
    a protector which stores a folded body of the airbag folded such that a lower edge side of the airbag comes close to an upper edge side of the airbag,
    wherein the upper edge side of the airbag is attached to an upper edge side portion of a vehicle body side on the upper edge side of the window,
    wherein the upper edge side portion includes a vehicle body side member which partially protrudes toward the vehicle inner side in a vicinity of an upper side of a storage region of the folded body,
    wherein the protector includes:
        a main body part which covers an outer peripheral side of the folded body excluding an inflation-deployment direction side of the airbag; and
        a cover part which is disposed in a disposition region of the vehicle body side member and interposed between the folded body and the vehicle body side member, and
    wherein the cover part includes a door part which is capable of being opened such that a tip end side is rotated upward while covering a region extending from a vehicle inner side lower corner part to a vehicle inner side surface of the vehicle body side member when the airbag is being deployed and inflated.

2. The head protection airbag apparatus according to claim 1,
    wherein the door part includes a thick reinforcing rib which is formed to extend substantially along an axial direction of the folded body.

3. The head protection airbag apparatus according to claim 2,
    wherein the reinforcing rib is formed at least on a region in contact with the vehicle body side member when the door part is opened.

4. The head protection airbag apparatus according to claim 3,
    wherein another second reinforcing rib is formed on a tip end side of the door part.

5. The head protection airbag apparatus according to claim 2,
    wherein the reinforcing rib is formed to protrude outward on an outer peripheral surface side of the door part.

* * * * *